T. D. Kellogg,
Meat Fish and Bait Preserver.
Nº 74,378. Patented Feb. 11, 1868

Witnesses:
Theo Tuske
J. A. Fraser

Inventor:
T. D. Kellogg
Per Murphy
Attorneys

United States Patent Office.

THEODORE D. KELLOGG, OF NEW YORK, N. Y.

Letters Patent No. 74,378, dated February 11, 1868.

---

IMPROVED METHOD OF PRESERVING BAIT FOR FISHING.

---

*The Schedule referred to in these Letters Patent and making part of the same.*

---

TO ALL WHOM IT MAY CONCERN:

Be it known that I, T. D. KELLOGG, of the city, county, and State of New York, have invented a new and useful Improved Method of Preserving Bait for Fishing and other purposes; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
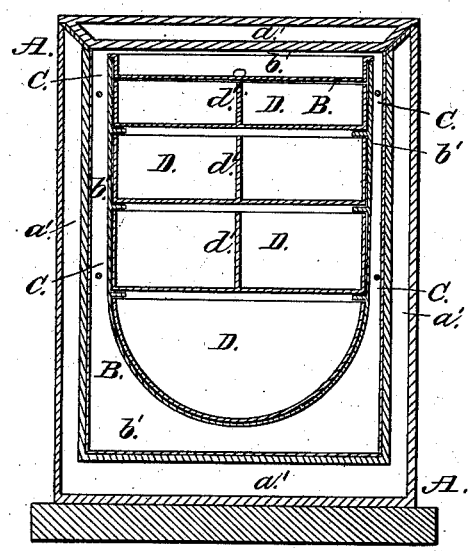
Figure 1 is a vertical section of my improved meat, fish, and bait-preserver, taken through the line $x\ x$, fig. 2.
Figure 2:
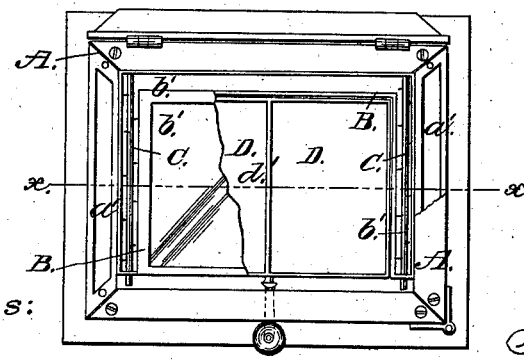
Figure 2 is a top view of the same, the top or cover of the outer or wooden box being removed, and parts being broken away.

My invention has for its object to furnish an improved means for preserving bait for fishing-vessels, so that the voyage need not be shortened, and the vessel be compelled to return to port without completing her cargo on account of the bait spoiling, and it consists in the construction of the various parts of the apparatus, as hereinafter more fully described.

For generations fishing has been carried on from the fishing-ports by vessels carrying their bait, packed in ice, in open pens, where the pressure of the large quantity of bait and ice, and the melting of the ice, causes such a rapid deterioration of the bait, that the trips, on this account, cannot average more than eleven days, only eight or ten of which are spent on the fishing-grounds, and of these few days, at least a third part, on an average, is spent in trying around, so that often, before a good berth for fishing is found, the bait is nearly or quite spoiled. By at once freezing the bait, and keeping it frozen, the results of the fishing could certainly be doubled, yet nothing has heretofore been done to improve upon the rude and primitive mode of preserving the bait hereinbefore described.

A is the outer case or box of the preserver, which is made of wood, and with double walls, so as to form chambers, $a'$, to prevent the access of heat from the outside to the ice-chamber. The spaces or chambers $a'$ may be filled with tan-bark, saw-dust, charcoal, or other suitable non-conducting material, or they may be made as close-air chambers. The top and front of the box A should open, for convenience in applying the freezing-mixture, and in inserting and removing the bait or other substance. The bevelled edges of the doors should be packed with listing or other suitable material, to guard against the ingress of air. B is the inner box or case, which should be made of metal, to allow the heat to pass from the bait or other article to be frozen to the freezing-mixture. The box, B, should be made with double walls, so as to form ice-chambers, $b'$, for the reception of the ice and salt, or other freezing-mixture. The chambers $b'$ should be formed upon the top, three sides, and bottom of the box, B, and a space should be left between the front side of the box, B, and the door of the box, A, of sufficient size to enable a temporary ice-chamber to be formed therein, when required. The bottom part of the inner wall should be rounded off, so that the ice may pass freely to the bottom of the chamber $b'$, and the angles or corners of the outer walls of said box, B, may, if desired, be filled up, so as to diminish the size of the lower part of said chamber $b'$. C are rods, provided with teeth, and passing horizontally through the chambers $b'$, by revolving which the ice may be rattled down in said chambers, and prevented from clogging. Any desired number of rods C may be used, and they may be revolved with small cranks, removably or permanently attached to their projecting ends. The interior of the box, B, may be divided into various compartments, and provided with drawers, D, for the reception of the bait or other articles to be frozen and preserved, so that they may not be injured by the pressure of their own weight, or by delay in freezing, for want of heat-conducting surface suitably proportioned to the quantity of the material to be preserved. The drawers D should be divided into several compartments by vertical partitions, $d'$, running parallel with the vessel's keel, so that the contents of the drawers D may not be dashed from side to side by the rolling of the vessel. This same thing may be accomplished by means of small frames, fitted into the drawers, and covered with netting. If desired, the drawers may be omitted, and the different compartments formed by horizontal metallic plates, resting upon metallic bars and cleats, attached to the said box, B, so as to prevent the lower layers from sustaining the pressure of the upper layers. This construction may be preferable where economy of cost or space is an object. The ice-chamber in front of the box, B, may be formed by placing plates in grooves formed in the sides of the box, B, or their ends may be supported by cleats, attached to said sides. These plates should equal in width the depth of the drawers, so that as the contents of each drawer, beginning with the upper one, are required to be removed, the plate in front of said drawer may be taken out without disturbing the lower ones. The water may be allowed to flow off through a pipe, bent into the form of an inverted siphon, so that sufficient water may always remain in the bend of the pipe to prevent the ingress of air. The ice and salt, or other freezing-mixture, is shovelled or thrown upon the top of the box, B, from which it falls into the chambers $b'$, until said chambers are completely filled.

When used on fishing-vessels, the boxes A and B should be so made that they may be taken apart, for convenience in placing it in and removing it from the vessel, but upon railroad-cars and river steamers this construction is not necessary. It should be observed that when the box, A, is made in detachable parts, the joints should be lined with listing or other suitable material, to prevent the entrance of air.

Having thus described my invention, I claim as new, and desire to secure by Letters Patent—

A bait-preserver, made and operating substantially as herein shown and described.

THEODORE D. KELLOGG.

Witnesses:
WM. F. McNAMARA,
JAMES T. GRAHAM.